Patented Jan. 22, 1929.

1,699,837

UNITED STATES PATENT OFFICE.

EDWARD A. EVERETT, OF NEW YORK, N. Y., ASSIGNOR TO NANDE CORPORATION, OF NEW YORK, N. Y., A CORPORATION OF NEW YORK.

DRILL CHUCK.

Application filed March 6, 1926. Serial No. 92,964.

Figure 1:
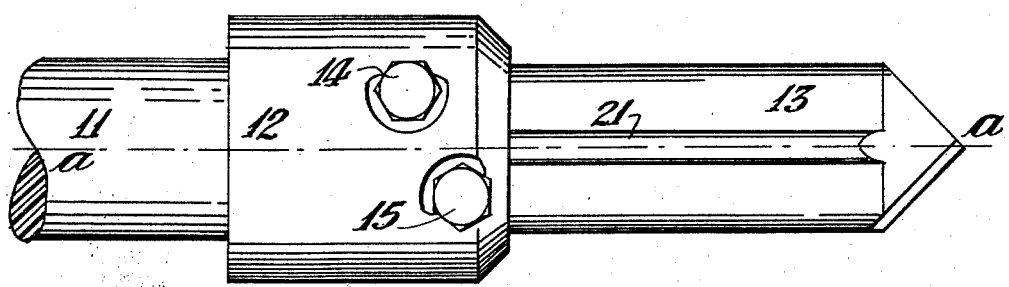
Figure 2:
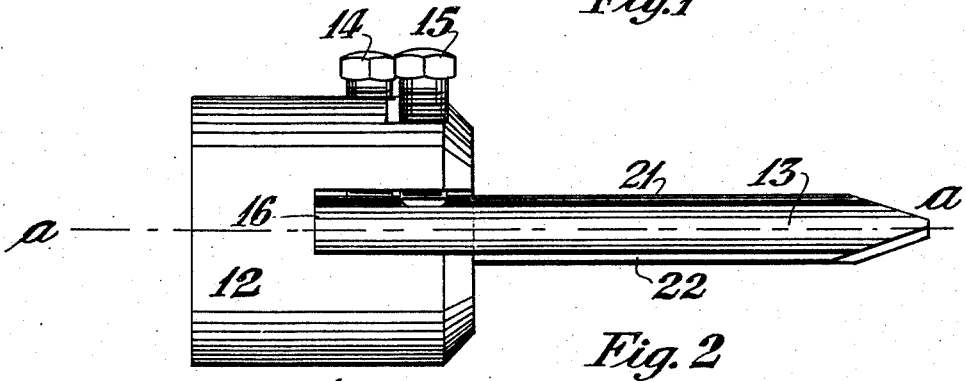
Figure 3:
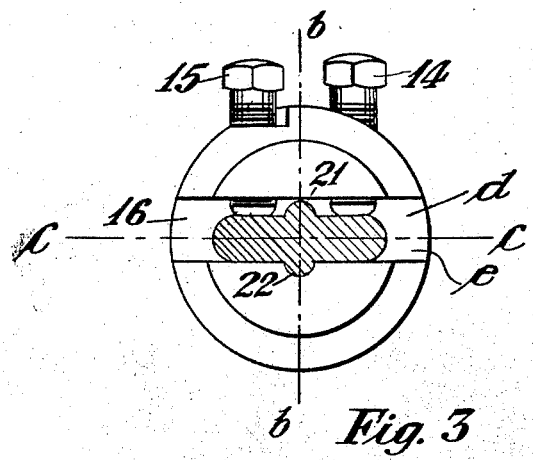

This invention relates to drill chucks and is particularly adaptable for drill bits made from flat stock. The objects of the invention are to make a chuck that is comparatively inexpensive, that insures the alignment of the drill bit and in which drills can be quickly replaced. These and other objects of the invention will be understood from the following specification and the accompanying drawings, in which, Fig. 1 is a plan view of a spindle fitted with a chuck according to this invention and in which a flat bit is secured; Fig. 2 is a side view corresponding to Fig. 1 and Fig. 3 is an end view with the bit in cross-section.

Drill bits of the type here shown are made from flat stock, either drawn or rolled and are uniform in section throughout and formed into a drilling point at the end. This stock is formed with semi-circular ridges on its longitudinal centre which stiffens the shank of the bit and forms the means by which it is held in alignment in the chuck.

The chuck is formed out of a solid piece screwed on the end of the spindle and is provided with a transverse slot to receive the end of the bit. This slot is wider than the bit and is off-centered so that when the flat side of the bit rests against one side of this slot, the transverse centre of the bit aligns with the transverse centre of the spindle. In this position the bit is clamped in place by two stud bolts. The transverse slot is open on both sides, being milled across the head of the chuck and is rectangular in form to match the rectangular end of the bit.

The bit is held in longitudinal alignment with the chuck by the stiffening ridge of the bit engaging a longitudinal groove in the chuck jaw. This construction holds the bit rigid in all directions, insures its alignment with the drill spindle under all conditions and replacement is effected in a simple manner by means of the two studs.

Referring to the drawings, 11 is the drill spindle to which the chuck 12 is secured, usually by a threaded connection. The drill bit 13 is clamped in the chuck 12 by the stud bolts 14 and 15. The chuck is provided with a transverse slot at 16 to receive the end of the bit.

The drill bit 13, as shown in section in Fig. 3 is made from flat stock with rounded edges and is provided with semi-circular stiffening ridges on its longitudinal centre as indicated at 21 and 22. Both sides of the bit are alike so that it can be turned over in the chuck and fit in either position.

In making this chuck a hole is drilled corresponding in size and position to the ridge 22, Fig. 3, then the transverse slot 16 is made. This slot is so located that the portion $e$ below the centre line $c$ is exactly equal to one half the width of the drill bit and the portion $d$ on the other side of the centre line $c$ is somewhat larger than half the width of the drill bit and the ridge combined so that the bit enters the slot with a clearance.

When the bit is placed in the slot, the ridge 22 engaging the corresponding groove in the chuck jaw holds the bit on the longitudinal centre of the spindle as indicated by the line $a$—$a$ and also centres the bit at right angles on the line $b$—$b$, Fig. 3.

The stud bolts 14 and 15 securely clamp the bit against the jaw of the chuck. These bolts, it will be noted are placed in staggered relation in the chuck jaw to distribute the clamping effect on the bit and to avoid weakening the jaw where the bolts enter.

It is obvious that the end of the stud bolts may become upset with use, but with this type of chuck, the bolts are merely released by a turn or so and are not removed when changing drills.

Since this chuck is made from a solid piece with no movable parts it is apparent that its cost is comparatively low.

Having thus described my invention, I claim:

In combination, a drill chuck including means for attaching a drill spindle and having a head, with a flat shaped drill bit of uniform shape and thickness and having a rectangular end, said bit formed with a central longitudinal ridge on each of its flat sides, said head formed with an off-centered transverse slot open on both sides forming a pair of fixed unmovable jaws spaced somewhat farther apart than the thickness of the bit and one larger than the other, and the larger jaw formed with a groove, opening into the transverse slot, so that when said bit rests in said transverse slot, a ridge of the bit rests in said groove and the rectangular end of the bit engages the slot in the head and the longitudinal centre line of the bit coincides with the longitudinal centre line of the spindle and a plurality of set screws at least one on each side of the longitudinal centre line and passing through the smaller jaw and engageable with the bit whereby the bit is held firmly in position and whereby the bit is practically unbound when the set screws are backed off.

In testimony whereof I hereunto affix my signature.

EDWARD A. EVERETT.